March 6, 1962 R. M. MILTON ETAL 3,023,841
DESORPTION OF OXYGEN-CONTAMINATED MOLECULAR SIEVES
Filed Oct. 22, 1957
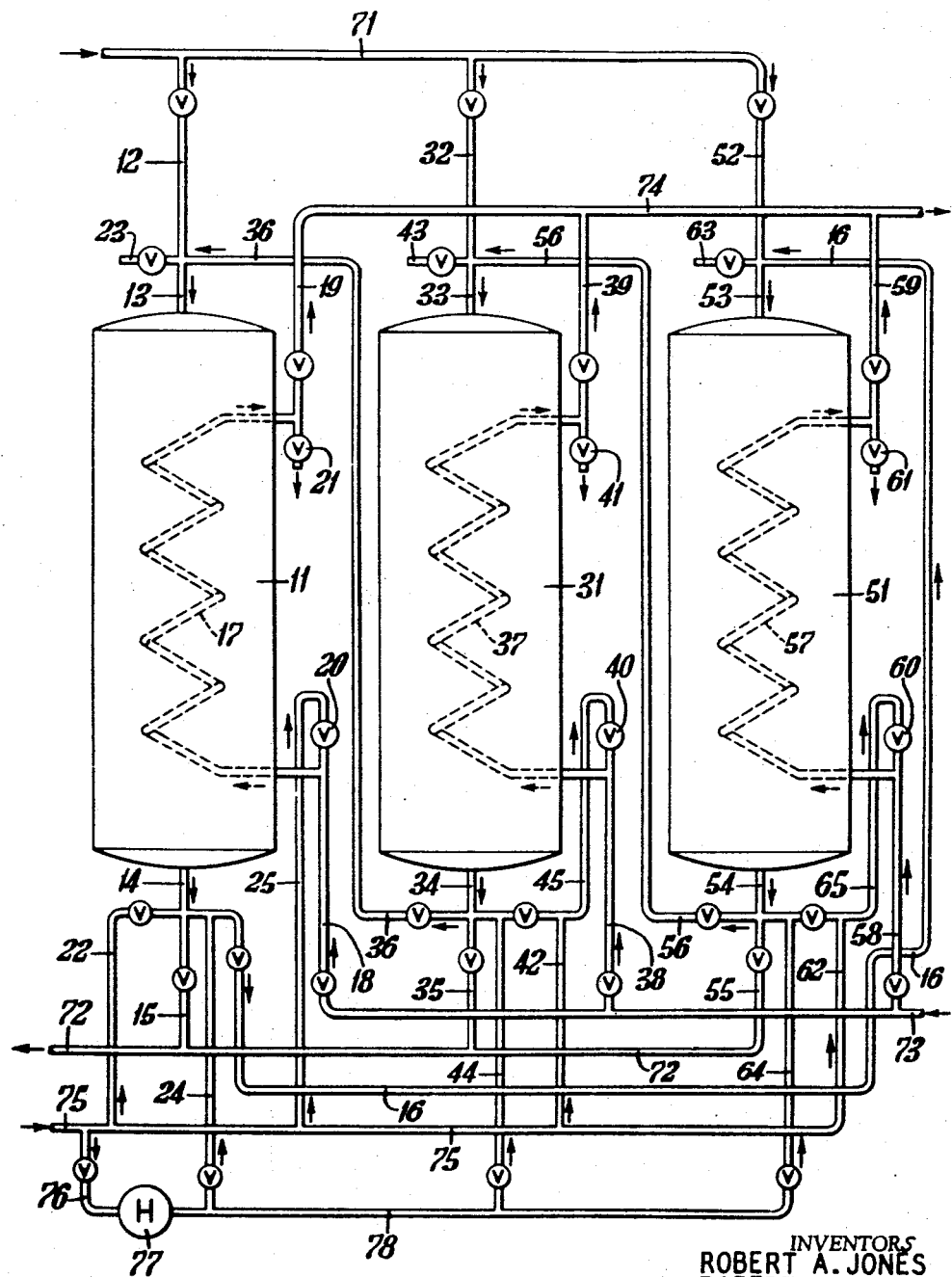
INVENTORS
ROBERT A. JONES
ROBERT M. MILTON
BY *William F. Mesinger*
ATTORNEY

United States Patent Office 3,023,841
Patented Mar. 6, 1962

3,023,841
DESORPTION OF OXYGEN-CONTAMINATED MOLECULAR SIEVES
Robert M. Milton, Buffalo, and Robert A. Jones, White Plains, N.Y., assignors to Union Carbide Corporation, a corporation of New York
Filed Oct. 22, 1957, Ser. No. 691,571
6 Claims. (Cl. 183—114.2)

This invention relates to the regeneration of a crystalline zeolitic adsorbent which is contaminated with oxygen.

It is an object of this invention to provide a process for effecting the desorption of oxygen from zeolitic molecular sieve adsorbents.

It is another object of this invention to provide a process for effecting the desorption of oxygen from sodium zeolite A.

Other objects will be apparent from the disclosure and appended claims.

By the process of the present invention, a bed of oxygen-contaminated zeolitic molecular sieve is heated while being swept with nitrogen to effect the desorption of the oxygen, swept with argon or helium to effect the desorption of adsorbed nitrogen, and cooled to a temperature below about −150° C. while sweeping the bed with helium, neon, or hydrogen. Prior to putting the bed or trap back on stream, it may be swept with cold (below −150° C.) argon to remove therefrom any traces of adsorbed helium, neon, or hydrogen. However, because of the insolubility of helium, neon and hydrogen in liquid argon, it is not absolutely necessary to purge the trap prior to use. If any of the materials are present in the purified argon leaving the trap during operation, they may be removed during the argon liquefaction step. These gases are not condensed under the conditions normally employed for argon condensation. Thus, since they are both insoluble and uncondensed, venting or sweeping the argon condenser periodically will remove these gases.

To illustrate the process of the present invention in terms of the single figure, the adsorbent is desorbed by passing heating fluid through the heat exchange pipe 57 and also by passing a hot desorbing gas through the adsorbent. The desorbing gas is one that is not appreciably adsorbed by the adsorbent at the desorbing temperature. Nitrogen at about 80° C. is satisfactory for use as both the heating fluid and the desorbing gas. For desorbing trap 51, the path of the warm nitrogen is through pipes 75, 62, 54, 53, and 63. A portion of the nitrogen in pipe 62 passes through pipe 65, valve 60, pipe 57, and valve 61, pipes 58 and 59 being blocked.

The adsorbent is heated to a temperature of about 50° C. By the time that the entire mass of adsorbent reaches this temperature, the atmosphere in the trap is substantially pure nitrogen and the oxygen has been substantially completely desorbed. At the time that the adsorbent is saturated with oxygen and taken off stream, at the end of the adsorption period, the adsorbent holds oxygen on the average to the extent of about 5 to 10 percent by weight of saturated adsorbent at −180° C. When the desorption in nitrogen gas is finished the oxygen content is less than 1 part oxygen per 100 parts of desorbed adsorbent.

Having thoroughly desorbed the oxygen from the adsorbent, the adsorbent is recooled to its adsorbing or operating temperature. If cooled, in an atmosphere of pure nitrogen, the adsorbent will adsorb some nitrogen. This nitrogen, once adsorbed, is not readily removed from the adsorbent and diminishes the capacity of the adsorbent for oxygen at the operating temperature. It has been found that if the nitrogen is purged from the trap by helium, and the adsorbent is cooled to its operating temperature in an atmosphere of substantially pure helium, very little helium is adsorbed by the adsorbent. The helium that is adsorbed does not interfere to any significant extent with the adsorption of oxygen from the feed mixture. For the purpose of cooling the adsorbent, other gases with boiling points of −240° C. or below, for instance neon and hydrogen, are satisfactory. Helium is the preferred cooling gas where the argon is to be used in welding since a relatively small amount of helium in the gas does no harm in the welding of most metals. Helium or its equivalent could be used as the desorbing gas but helium is costly as compared with nitrogen and consequently nitrogen is preferred as the desorbing gas and helium as the cooling gas. The helium is run into the trap while the trap, adsorbent and helium are hot because for best results there should be no cooling of the adsorbent below about 25° C. in the presence of any substantial quantity of nitrogen. For purging nitrogen and cooling the traps, as soon as the gas flowing out of the traps shows that all or substantially all of the oxygen has been removed, the flow of nitrogen is stopped, and the flow of helium is begun. The flow of helium is continued until the effluent shows that all or substantially all of the nitrogen has been purged. The trap is kept open to the helium supply so that only helium can enter the trap as the trap is cooled. The trap is further cooled by cooling medium supplied through heat exchange pipe 57. When the trap and adsorbent are down to operating temperature the helium supply is stopped, and the trap 51 is ready to go on indirect stream in series with trap 11. After going on indirect stream, the trap 51 will for a short time pass argon containing some helium or such other gas as was used for cooling. An alternate method of removing the purge nitrogen from the warm traps of adsorbent is to pass crude argon through the traps until essentially all of the nitrogen has been removed. If desired this argon may be removed by purging with helium prior to cooling. During cooling helium is added to the trap to maintain a positive pressure.

Following the procedure just described, each trap in turn may be put indirectly on stream, then directly on stream, then cut off and desorbed and then again put indirectly on stream. Any number of traps may be used, and if more than one, they may be used in series as described or simultaneously or successively in parallel or in any desired combination.

The operating limitations of the molecular sieve regeneration are not generally critical. Initially, the oxygen-contaminated molecular sieve should be heated to at least 0° C. for the oxygen desorption step; however, the higher the temperature employed during this step, the greater will be the desorption of oxygen. A temperature range of from about 30° C. to 50° C. has been found to be most satisfactory for the oxygen desorption.

The molecular sieve may be heated merely by passing a heating fluid through the heat exchange pipe 57, or by embedding an electrical heating coil in the molecular sieve bed. However, because of the low heat transfer in the molecular sieve bed, the presence of a heat transfer gas greatly facilitates the step. In addition, by sweeping the bed with the hot transfer gas during heating, the oxygen removal is further increased. Either dry nitrogen or dry argon may be satisfactorily employed in the desorption step. However, a large volume of desorption gas is generally necessary, making the use of argon impractical.

For most satisfactory operation, the desorption gas should be passed through the molecular sieve bed in the opposite direction from the direction of gas flow during on-stream operation, i.e., from the purified argon outlet to the argon-contaminated argon inlet. By this procedure, desorbed oxygen will be pushed back in the direction of maximum contamination, thereby preventing further contamination of the cleaner section of the bed.

Nitrogen is very strongly adsorbed by the molecular sieve at lower temperature; thus the traps should be purged of nitrogen prior to cooling the molecular sieve very much. Warm argon or helium may be used for this purpose. Argon is preferred because it is readily available.

The next step is to cool the trap down for use in the argon purification system. The cooling is effected by passing a coolant such as kettle liquid from an air separation column through the embedded coils while maintaining a flow of a heat-transfer gas through the trap. As was stated previously, nitrogen is very strongly adsorbed at lower temperatures. Similarly, argon, at temperatures in the range of from about −130° C. to about −150° C. is strongly adsorbed. Argon adsorbed in this temperature range is not readily displaced by oxygen even at the lower operating temperatures, and the oxygen capacity of the molecular sieve is seriously reduced. Thus, some other gas must be employed as the heat-transfer agent during the cooling step, at least when the molecular sieve is at a temperature in the range of from about −130° C. to about −150° C. Neon, hydrogen, and particularly helium have been found to be suitable for this purpose. During this step, the coolant gas pressure on the trap should be maintained at a minimum of about 1 to 2 p.s.i.g. thereby diluting any argon remaining from the purge step. In addition to minimizing the argon adsorption during cooldown through the critical temperature range, the positive coolant gas pressure prevents air and moisture from being drawn into the trap. Additionally, hydrogen and helium transfer heat more rapidly than any of the other available gases.

After the trap is cooled down below the critical temperature range, i.e., below −150° C. it may be purged with cold, refined argon, thereby avoiding contamination of the refined argon with coolant gas during operation. However, this step is not necessary. The refined argon is liquefied for storage, and the coolant gases may be separated during the argon condensation step. However, purging of the coolant gas is a preferred step because it avoids binding of the condenser with uncondensed gas and because it provides an additional check on the cleanliness of the trap before it is returned to service.

The process described herein is suitable for the regeneration of any oxygen-contaminated molecular sieve which has a pore size which will admit molecules which have an effective diameter of 4A. and smaller and exclude larger molecules.

Certain materials, for example water, that may be adsorbed by the adsorbent will not be removed by the desorption process outlined above. When these materials are present the adsorbent is regenerated rather than desorbed. The regeneration may be effected in the same manner as the desorption except that the trap and adsorbent are heated to a much higher temperature, for example, up to 350° C., in the presence of nitrogen. For regenerating the adsorbent, nitrogen is passed through pipe 76, through high temperature heater 77, through pipe 64, and through pipe 54 into the trap. It is essential that the dehydrated sodium zeolite A used in the process of the invention carry no more than about 3 percent by weight of water during the description. Preferably about 1 percent or less water by weight of adsorbate is present.

The purification of argon is greatly simplified by the invention herein disclosed. At a temperature of about −183° C. and a pressure of about 700 mm. of mercury, 22.2 percent of oxygen and 1.5 percent argon by weight of adsorbate is adsorbed in zeolite A. The argon which comes through the trap in the preferred embodiment of the process is substantially free from oxygen or other contaminants and is ready for use in welding, or other processes requiring pure argon, but out additional treatment. It will of course be understood that the process of the invention is not limited to the apparatus shown in the drawing but may be performed with any suitable equipment without departing from the scope of the invention.

As used herein the term "molecular sieve" refers to three dimensional crystalline zeolites. A zeolitic molecular sieve is a three dimensional crystalline, metal alumino-silicate having the general formula:

$$M_{2/n}O:Al_2O_3:xSiO_2:yH_2O$$

wherein "M" represents a metal, and "n" its valence. A particular zeolitic molecular sieve has values for "x" and "y" that fall in a definite range. Activation of these zeolitic molecular sieves by effecting the loss of the water of hydration leaves a crystalline structure interlaced with channels of molecular dimensions offering very high surface area for the sorption of foreign molecules.

Sorption is limited to molecules having size and shape such as to permit entrance through the pores to the inner sorption area, all other molecules being excluded. The common adsorbents such as alumina and silica gel do not exhibit molecular sieve action.

As used herein the term "effective diameter" of a molecule refers to that dimension which determines conclusively the ability of a molecule to enter a circular opening of a given diameter. For example, the effective dimension of a needle would be the diameter of the needle rather than the length of the needle since it would be this dimension which would finally determine the needle's ability to pass into a given opening.

This application is a continuation-in-part of patent application, Serial No. 400,340, filed December 24, 1953, having issued October 22, 1957 as U.S. Patent No. 2,810,454.

What is claimed is:

1. A process for treating an oxygen-contaminated crystalline zeolitic molecular sieve having a pore size which will admit molecules having a maximum effective diameter of 4 A. and exclude larger molecules which comprises heating the said oxygen-contaminated molecular sieve at a temperature of at least 0° C. in an atmosphere of at least one gas selected from the group consisting of dry nitrogen and dry argon; purging such selected gas from the heated molecular sieve with a gas displaceable by oxygen while maintaining said molecular sieve at a temperature wherein the selected purged gas is not strongly adsorbed; and cooling said molecular sieve to a temperature below −150° C., said cooling to be effected in an atmosphere of at least one gas selected from the group consisting of dry neon, dry hydrogen and dry helium at least during the period wherein the molecular sieve is at a temperature in the range of from about −130° C. to about −150° C.

2. A process in accordance with claim 1 wherein the cooled molecular sieve is purged with cold refined argon while maintaining the molecular sieve at a temperature below −150° C.

3. A process for treating an oxygen-contaminated crystalline zeolitic molecular sieve having a pore size which will admit molecules having a maximum effective diameter of 4 A. and exclude larger molecules which comprises heating the said oxygen-contaminated molecular sieve at a temperature of at least 0° C. in an atmosphere of nitrogen; purging nitrogen from the heated molecular sieve with argon while maintaining said molecular sieve at a temperature wherein nitrogen is not strongly adsorbed; and cooling the nitrogen purged molecular sieve to a temperature below −150° C., said cooling to be effected in an atmosphere of helium at least during the period wherein the molecular sieve is at a temperature in the range of from about −130° C. to about −150° C.

4. A process in accordance with claim 3 wherein the cooled molecular sieve is purged with cold refined argon while maintaining the molecular sieve at a temperature below −150° C.

5. A process in accordance with claim 3 in which the oxygen-contaminated molecular sieve is heated to a temperature of 30° C. to 50° C. in the nitrogen atmosphere.

6. A process in accordance with claim 4 in which the oxygen-contaminated molecular sieve is heated to a temperature of 30° C. to 50° C. in the nitrogen atmosphere.

References Cited in the file of this patent

UNITED STATES PATENTS

| | | |
|---|---|---|
| 2,519,874 | Berg | Aug. 22, 1950 |
| 2,544,214 | Berg | Mar. 6, 1951 |
| 2,548,192 | Berg | Apr. 10, 1951 |

OTHER REFERENCES

Article in Trans. Faraday Soc., vol. 40, 555–64 (1944).

Article in Trans. Faraday Soc., vol. 45, 358–373 (1949).

Article in J. Am. Chem. Soc., vol. 65, pages 1253–62 (1943).